H. G. ALDRIDGE.
CUTTER HEAD.
APPLICATION FILED JUNE 6, 1912.
1,083,174.
Patented Dec. 30, 1913.
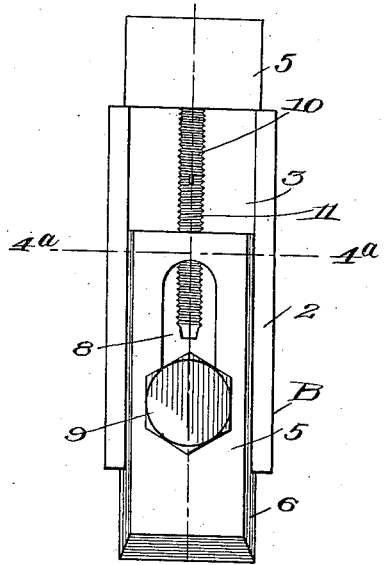
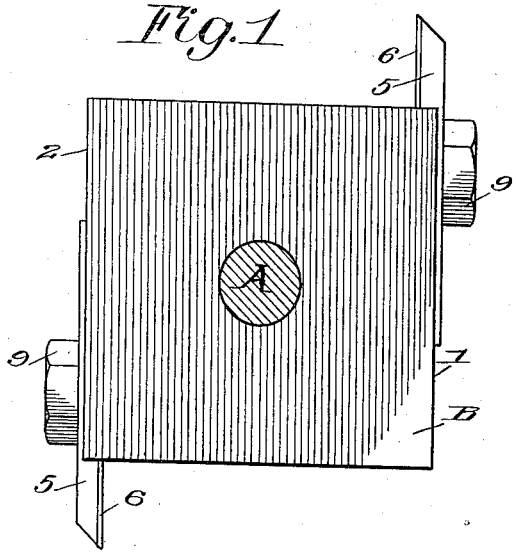
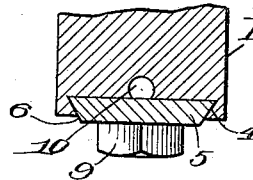
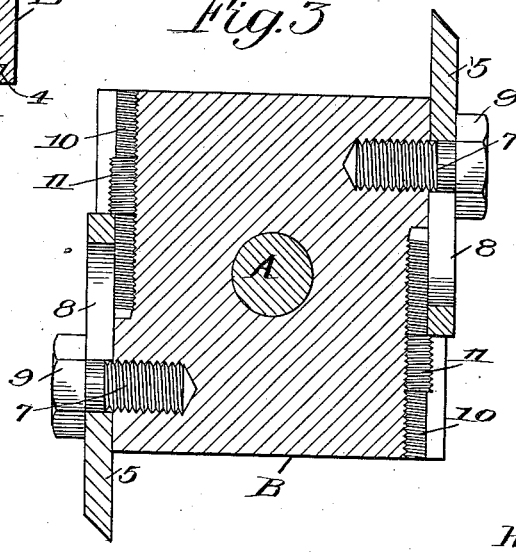
Witnesses
Nelson H. Copp
H. E. Stonebraker
Inventor
Harry G. Aldridge
By Church & Rich
his Attorneys

UNITED STATES PATENT OFFICE.

HARRY G. ALDRIDGE, OF ROCHESTER, NEW YORK, ASSIGNOR TO HUTHER BROTHERS SAW MFG. CO., OF ROCHESTER, NEW YORK, A CORPORATION OF NEW YORK.

CUTTER-HEAD.

1,083,174.  Specification of Letters Patent.  Patented Dec. 30, 1913.

Application filed June 6, 1912. Serial No. 702,007.

*To all whom it may concern:*

Be it known that I, HARRY G. ALDRIDGE, of Rochester, in the county of Monroe and State of New York, have invented certain new and useful Improvements in Cutter-Heads; and I do hereby declare the following to be a full, clear, and exact description of the same, reference being had to the accompanying drawings, forming a part of this specification, and to the reference-numerals marked thereon.

My invention relates to a cutter head, being constructed more particularly for use on the mandrel of the ordinary saw table, and for such work as jointing treads and the like, sticking moldings, or window sash, and it has for its object to provide a device that may be manufactured at small cost, and which enables the tools to be adjusted and secured readily.

A further object of the invention consists in providing a construction in which the tools are held rigidly in their operative positions with respect to the head.

To these and other ends the invention consists in certain improvements and combinations of parts all as will be hereinafter more fully described, the novel features being pointed out in the claim at the end of the specification.

In the drawings: Figure 1 is a side elevation of a cutter head constructed in accordance with the invention. Fig. 2 is an elevation of the parts appearing in Fig. 1, looking toward the same from the right. Fig. 3 is a vertical sectional view on the line 3ª—3ª of Fig. 2, and Fig. 4 is a detail sectional view on the line 4ª—4ª of Fig. 2.

Similar reference numerals in the several figures indicate the same parts.

A designates the mandrel, such as is to be found on the usual saw table, and to which the head B may be secured in any convenient manner.

The head B, as disclosed in the present embodiment, consists of an integral, square body, provided with tool supporting faces, designated at 1 and 2, respectively. The tool supporting faces 1 and 2 are constructed with guideways, or grooves, to receive the cutting tools, and these guideways are undercut preferably of dovetail formation in cross section, the tools being similarly formed, and coöperating with the guideways in the manner shown in Fig. 2. The guideways are shown at 3, being undercut at 4, while 5 designate the cutting tools provided with the inclined edges 6 which coöperate with the guideways as shown in Figs. 2 and 4.

In order to hold the tools in fixed position on the head, the latter is provided with threaded openings which receive the headed bolts 7. The cutting tools are provided with slots or cutaway portions 8 through which the bolts 7 pass into the cutter head, the tools being held in engagement by means of the heads 9 on the bolts which engage the outer surfaces of the tools.

In order to provide a convenient means for obtaining a quick and accurate adjustment of the tools for different kinds of work, the guideways are provided with threaded recesses or openings 10, extending lengthwise of their bottoms, and 11 are headless bolts movable in the recesses 10 as shown, and projecting slightly above the bottom surfaces of the guideways, as shown in Fig. 3. The adjusting bolts 11 project far enough above the bottom surfaces of the guideways to engage the ends of the cutting tools, and in this manner, by turning the bolts 11, the tools may be adjusted to any desired position relatively to the head, being held in such position by the aforementioned bolts 7, coöperating with the bolts 11, and with the inclined walls of the guideways. The cutting tools may be adjusted to their desired positions by any suitable form of gage as is well known in the art.

I claim as my invention.

The combination with a cutter head embodying a square solid body having oppositely disposed supporting faces provided with undercut guideways coextensive with said faces, of tools arranged in the guideways having a cross section corresponding therewith whereby movement of the tools perpendicularly to the guideways is prevented, the bottoms of the guideways being provided with threaded recesses extending longitudinally, and having their axes arranged below the bottoms of the guideways, threaded bolts disposed in said recesses and having comparatively small portions projecting above the bottoms of the recesses so as to engage the tools, the latter being provided with slots or openings and the bolts coöperating with said slots to hold the tools on the head in their adjusted relation.

HARRY G. ALDRIDGE.

Witnesses:
H. E. STONEBRAKER,
HENRY W. HALL.

Copies of this patent may be obtained for five cents each, by addressing the "Commissioner of Patents, Washington, D. C."